R. CONRADER.
APPARATUS FOR ACTUATING LIQUIDS.
APPLICATION FILED OCT. 14, 1904.
979,746.
Patented Dec. 27, 1910.
3 SHEETS—SHEET 2.
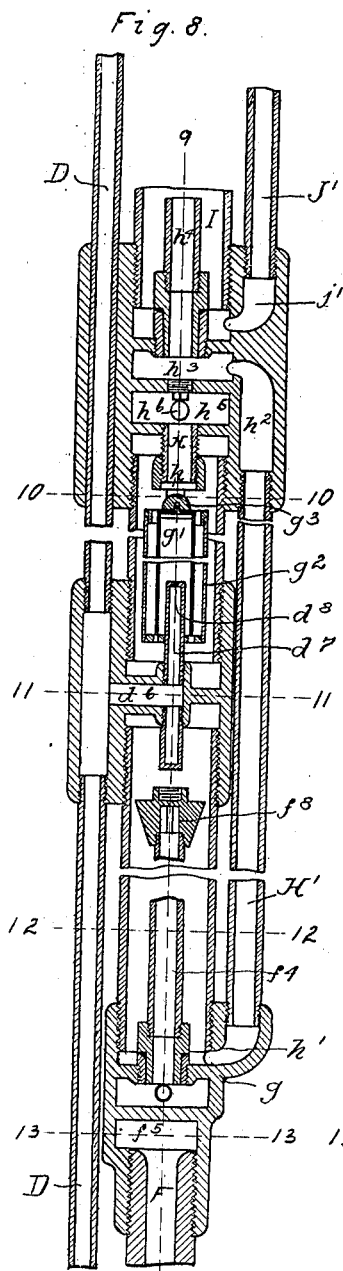
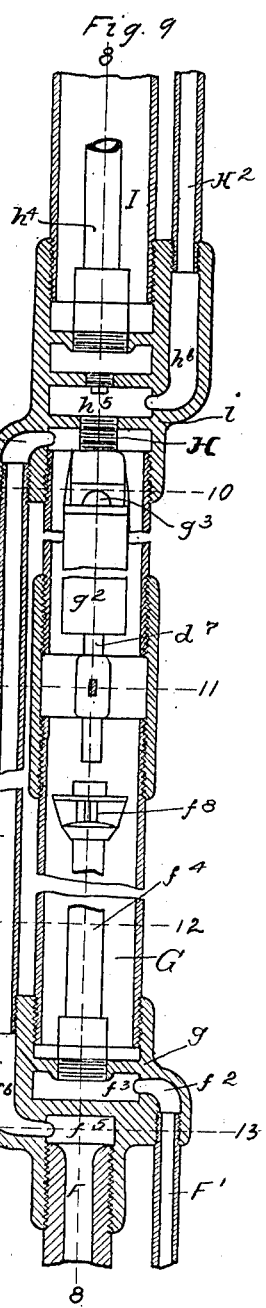
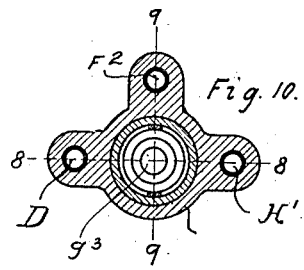
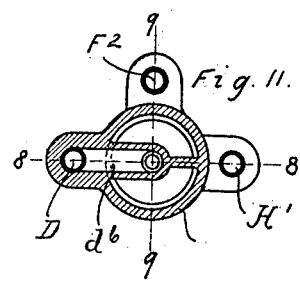
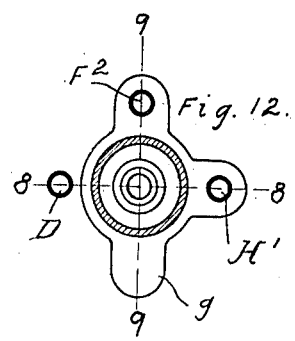
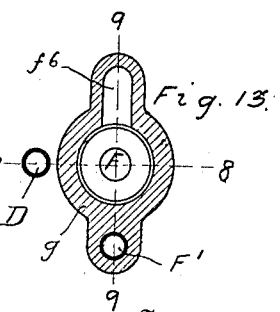
Witnesses
C. B. Burgers
M. C. Sullivan
Inventor
Rudolph Conrader
by H. C. Lord
Attorney R. CONRADER.
APPARATUS FOR ACTUATING LIQUIDS.
APPLICATION FILED OCT. 14, 1904.
979,746.
Patented Dec. 27, 1910.
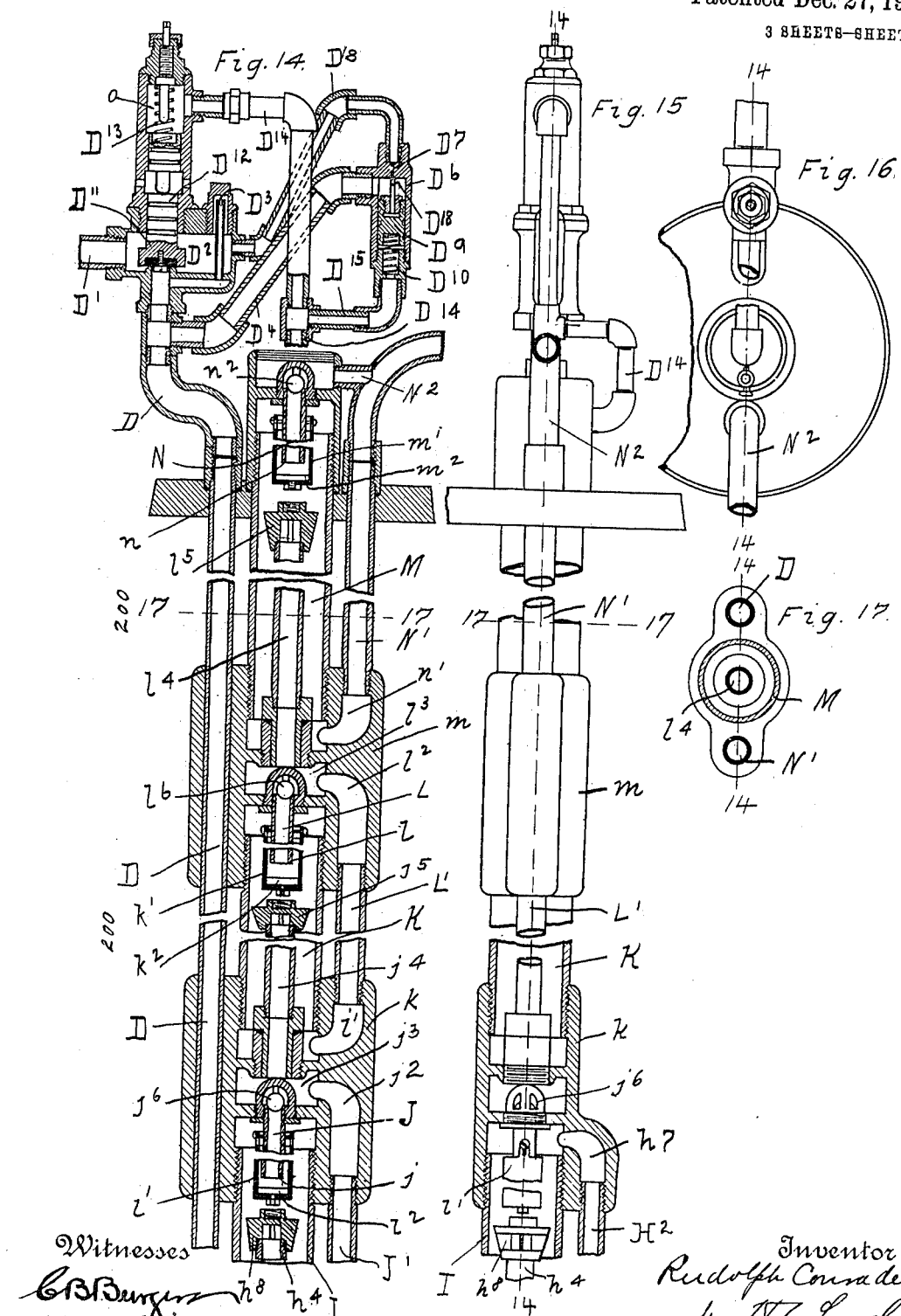

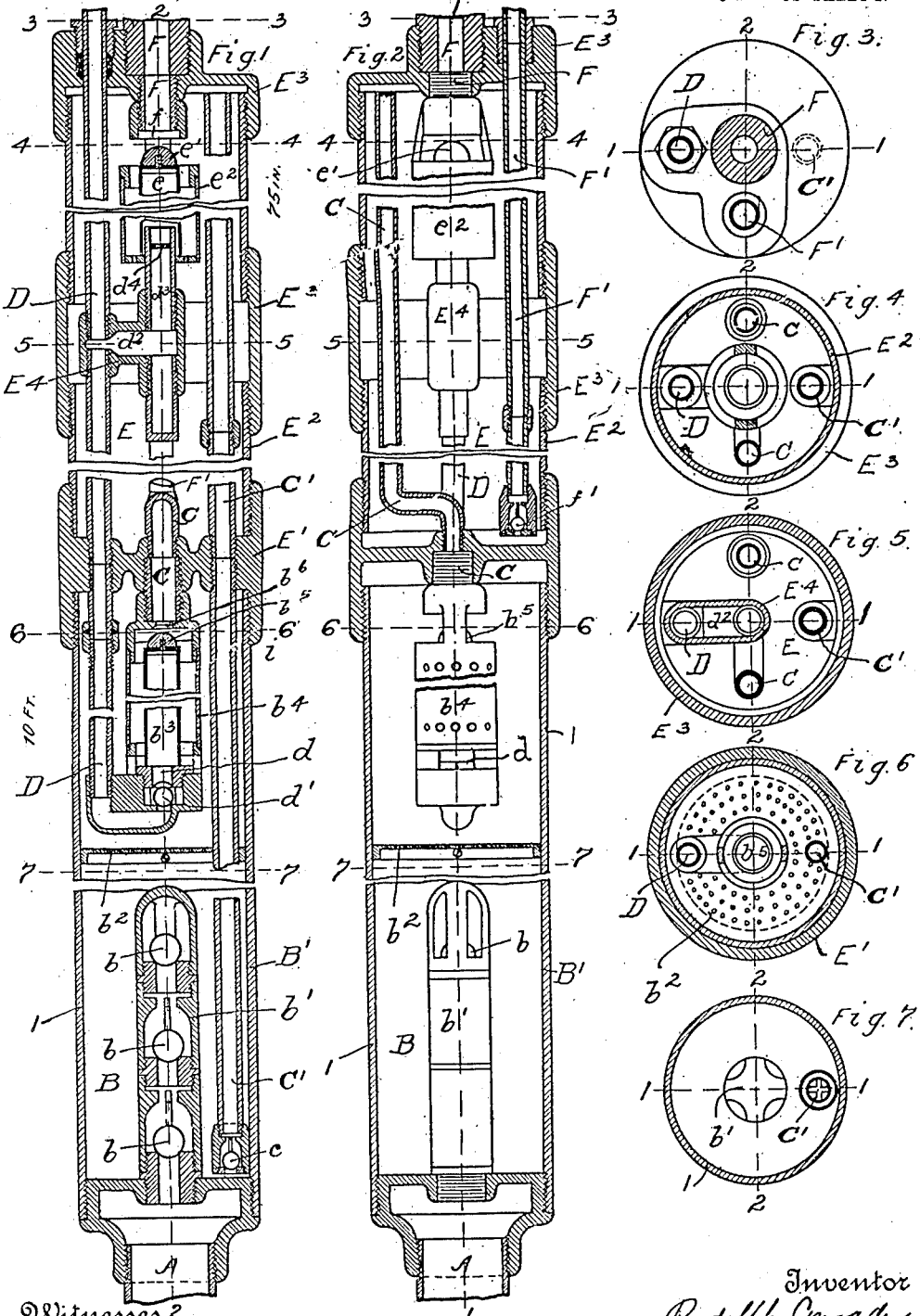

UNITED STATES PATENT OFFICE.

RUDOLPH CONRADER, OF ERIE, PENNSYLVANIA.

APPARATUS FOR ACTUATING LIQUIDS.

979,746.     Specification of Letters Patent.     Patented Dec. 27, 1910.

Application filed October 14, 1904. Serial No. 228,463.

*To all whom it may concern:*

Be it known that I, RUDOLPH CONRADER, a citizen of the United States, residing at Erie, in the county of Erie and State of Pennsylvania, have invented new and useful Improvements in Apparatuses for Actuating Liquids, of which the following is a specification.

This invention relates to apparatuses for actuating liquids, and consists in certain improvements in the construction thereof as will be hereinafter fully described and pointed out in the claims.

Among the objects of the invention may be stated the raising of liquids from wells such as oil wells with a low pressure and with as little mechanism in the well as is feasible.

The invention contains in addition to this, many features which may be said to be included in the objects of the invention.

The invention is illustrated in the accompanying drawings as follows:—

Figure 1 is a section on the line 1—1 in Figs. 2, 3, 4, 5, 6 and 7, it being a vertical section through the lower part of the pumping mechanism. Fig. 2, is a section on the line 2—2 in Figs. 1, 3, 4, 5, 6 and 7. Fig. 3 is a section on the line 3—3 in Figs. 1 and 2. Fig. 4 is a section on the lines 4—4 in Figs. 1 and 2. Fig. 5, a section on the line 5—5 in Figs. 1 and 2. Fig. 6, a section on the line 6—6 in Figs. 1 and 2. Fig. 7, a section on the line 7—7 in Figs. 1 and 2. Fig. 8 is a section on the line 8—8 in Figs. 9, 10, 11, 12 and 13. Fig. 9 is a section on the line 9—9 in Figs. 8, 10, 11, 12 and 13. Fig. 10 is a section on the line 10—10 in Figs. 8 and 9. Fig. 11, a section on the line 11—11 in Figs. 8 and 9. Fig. 12, a section on the line 12—12 in Figs. 8 and 9. Fig. 13, a section on the line 13—13 in Figs. 8 and 9. Fig. 14, a section on the line 14—14 in Fig. 15. Fig. 15 is a side elevation partly in section the point of view being from the side of Fig. 14. Fig. 16 is a plan view of the device. Fig. 17, a section on the line 17—17 in Figs. 14 and 15.

In the drawings Figs. 14, 8 and 1 form a section taken in the same plane from the top of the apparatus to the bottom and Figs. 15, 9 and 2 are sections taken at right angles to the sections in Figs. 14, 8 and 1.

The invention is shown as adapted to an Artesian well, especially an oil well. The oil is admitted through the usual entrance tube or strainer A, passes through a series of check valves $b$ into a pump chamber B. This pump chamber may be termed the primary pump chamber, although where that term is used in the claims it may refer to some subsequent chamber, the subsequent chamber being primary to some chamber above it. The check valves $b$ are arranged in the cages $b'$. A multiple check of this character is desirable in most apparatuses of this kind, but it is peculiarly important in connection with the scheme of pumping herewith disclosed.

Near the top of the chamber B which may be of any desirable length but preferably about 10 feet is arranged a float $b^3$. A strainer $b^2$ prevents the passage of dirt or grit to this float, and the valve controlled by it. The float is arranged in the cage $b^4$ and carries on its upper end a valve $b^5$. This valve $b^5$ is arranged to operate on a seat $b^6$ and controls an escape or vent passage C. The float $b^3$ is simply an inverted cup. Actuating fluid, ordinarily air or gas is admitted through a pipe D which extends to the top of the well. It passes through the passage $d$ directly under the float $b^3$ so that should the cup through any leakage or otherwise become somewhat filled with oil the air, coming from the supply pipe, will pass into the cup thus restoring its buoyancy. A check valve $d'$ prevents the passage of oil into the supply pipe D. Oil is carried from the chamber B by a pipe C' and conveyed to the secondary or storage chamber E.

The main supply of air comes to the well through a pipe D'. This of course may be of a greater or shorter distance from the compressor, but ordinarily adjacent to a main. The air passes to a valve chamber D² and from the valve chamber D² to a contracted passage D³ which wire draws the air and delivers to the chamber continuously a small volume of air. The air passes through this contracted passage D³ by a passage in the valve chamber to the pipe D.

The small volume of air passing through the contracted passage D³ passes down into the pump chamber B, then out of the escape passage C through the succeeding chambers of the system and exhausts. The volume of air delivered to the chamber in this way is so small as compared with the outlet or means for escape that no appreciable pressure is developed in the chamber and the liquid therefore passes in freely. When however the liquid reaches the top of the chamber, it acting upon the float $b^3$ cuts off the means of escape through the passage C. Through the continuous passage of actuating fluid to the chamber it soon accumulates and creates pressure and this pressure forces the liquid through the discharge pipe C′, the liquid rising in said pipe as the pressure increases. The pressure on the valve $b^5$ is sufficient to keep it seated after the liquid has fallen away from it. All the liquid may be expelled in this manner from the chamber B, that is by actuating fluid passing through the restricted opening alone. I prefer however to hasten this by the following mechanism. (See Fig. 14.)

The pipe D is connected by a pipe $D^4$ with a valve chamber $D^6$. A pipe $D^8$ passes from the chamber $D^2$ to the inlet end of this valve chamber. A passage $D^7$ connects the pipe $D^8$ with the chamber $D^6$, and a needle valve $D^{18}$ controls this passage. The needle valve is actuated by a piston $D^9$. The piston $D^9$ is ordinarily forced forward in the chamber $D^6$ by a spring $D^{10}$ and is normally closed by this spring. As the pressure however increases in the pipe D and consequently the pressure on the piston $D^9$ is sufficient to overcome the force of the spring $D^{10}$, the valve $D^{18}$ is open, thus turning in a supply of actuating fluid. It will be noted also that this turning in of actuating fluid is automatically accomplished through the supply pipe, and specifically by the fluid pressure in said pipe and that this mechanism is arranged at a point remote from the chamber. This is important in oil wells, in that it permits of the arrangement of mechanism without the well where it is accessible.

The chamber B is formed of the bottom through which the oil is introduced and ordinarily of a piece of tubing B′ which is screwed into the bottom E′ of the chamber E. The check valve $c$ is preferably arranged in the pipe C′. The device however might be operated without it.

The discharge pipe C′ discharges into the chamber E preferably near its top. The chamber E is ordinarily much longer than the chamber B. In ordinary practice it may be made 120 feet in length. It has its walls formed of tubing $E^2$ the upper part of these walls being connected by a fitting $E^3$, the purpose of which will be hereinafter described. This extended length of chambers as indicated by the chambers B and E is particularly desirable in Artesian wells because it permits a comparatively uniform surface, so that the apparatus may be removed from wells which have caved in. This is not an uncommon thing in oil wells. The chamber is therefore made of considerable length so that it may extend above the point where this ordinarily occurs.

The escape pipe C passes through the bottom E′ and extends to near the top of the chamber E as is clearly shown in Fig. 2. After the charge from the primary chamber has been delivered to the storage chamber, the pressure of course continues until the pressure practically balances on the two chambers E and B. This immediately releases the valve $b^5$ and connects the chambers through the passage C. The chamber E is provided with an escape passage F very similar in its function to the escape passage C, and it permits the escape of actuating fluid which is delivered through the pipe D, as it escapes through the pipe C, so that as soon as the charge has been delivered to the chamber E and the balancing pressure has taken place opening the valve $b^5$, the pressure in the chamber B is immediately reduced to practically atmospheric pressure so as to permit of its refilling.

The escape pipe F is provided with the seat $f$ on which is adapted to operate the valve $e'$. The valve $e'$ is carried by the float $e$ similar in construction to the float $b^3$. This float is arranged in the cage $e^2$. A by-pass $d^2$ preferably leads from the pipe D to a passage $d^3$. A minute opening $d^4$ forms a leak directly under the float $e$, the purpose of which is to assure the maintenance of air in the float.

When the chamber E becomes filled the liquid operating upon the float $e$ closes the valve $e'$, thus cutting off the escape. This action of course is immediately following or during the movement of a charge of liquid into the chamber E from the chamber B, so that the pressure which is forcing the discharge into the chamber E is not permitted to escape through the pipe F. If the discharge to the chamber E fills the chamber, so as to close the valve $e'$ in the middle of a charge from the chamber B, liquid will pass over the overflow afforded by the escape pipe C and return to the chamber B, and passing down this escape pipe will balance the pressure on the valve $b^5$, and it in consequence will drop. The actuating fluid will then pass through this escape pipe C from the chamber B to the chamber E and it will accomplish this with practically no diminution in the pressure, so that the valve $D^{18}$ will remain open and actuating fluid will then force the liquid from the chamber E, the liquid passing through the pipe F′ past a check valve $f'$. The arrangement permitting the overflow through the escape pipe and connection between the two chambers prevents the blocking of the apparatus where the charge from the chamber B is more than sufficient to fill the chamber E.

The chamber E acts as a storage chamber and the liquid is carried from it to what may be termed the measuring chamber G. The pipe F′ is connected with the bottom $g$ of the chamber G and the liquid is carried through the passage $f^2$ to a bypass $f^3$ in the bottom, the bypass being connected with an upright $f^4$. The upper end of the upright is provided with a spreader $f^8$ which deflects the oil as it is discharged laterally, so that it will be thrown into engagement with the walls of the upright or the chamber and in running down these prevents serious agitation. The chamber G is ordinarily about 200 feet long, but is ordinarily smaller in diameter than the chamber E so that only measured charges are taken from the chamber E. The escape pipe F from the chamber E connects with a bypass $f^5$ in the bottom $g$ and extends through a passage $f^6$ in said bottom through a pipe $F^2$, and passage $f^7$ in the bottom $i$ of the chamber I to the top of the chamber G.

In the normal operation of the apparatus the charge held in the storage chamber E is more than sufficient to fill the chamber G so that the chamber G has the function of a measuring chamber. As the liquid rises in the chamber G, it acts upon a float $g'$. This float is similar in construction to the floats heretofore described, and is arranged in the cage $g^2$ and carries the valve $g^3$. This valve is adapted to operate upon a seat $h$ controlling the escape passage H. These escape passages H during the filling operation of the primary chamber allow the escape of actuating fluid to pass through to it from the chambers below, so as to prevent any back pressure in the chamber B. The float $g'$ having been acted upon by the liquid closes the escape passage H and immediately thereafter there is a balancing of pressure in the chamber G and chamber E. This balancing of pressure releases the valve $e'$ which after the falling of the liquid from the float has been held to its seat by the air pressure. This balancing of pressure is effected by the overflow of liquid from the chamber G, or if it is desired to prevent the direct action of liquid on the valve, it may be accomplished by the trapping of air above the escape pipe H.

It will be noted that to lift the liquid from the chamber B to the chamber E does not require as high pressure as it does to lift the liquid from the chamber E to the chamber G. It is desirable to facilitate this latter movement by an additional supply of air and to accomplish this I provide the following mechanism (see Fig. 14). A valve $D^{11}$ is arranged to cover the passage from the chamber $D^2$ to the pipe D. This is carried by the piston $D^{12}$. The piston $D^{12}$ is actuated by the spring $D^{13}$. When the pressure in the pipe D reaches a point higher than that necessary to open the valve $D^{18}$ and higher than that necessary to move a charge from the chamber B to the chamber E, the valve $D^{11}$ is opened, thus supplying a large volume of actuating fluid for raising the liquid from the chamber E to the chamber G. It will be noted that there has been no escape of air pressure from the time it went on to take the last charge from the primary chamber to the chamber E, the pressure continuing to lift the liquid from the chamber E to the chamber G, and the escape valve of the chamber G being closed before the escape valve to the chamber E is opened, the actuating fluid is trapped in the chamber G and immediately after the balancing action above described and the opening of the valve $e^2$ begins the forcing action on the chamber G, the lifting action from the chamber B ceasing at this point. Thus a measured charge of liquid, a charge equal to the capacity of the chamber G is started upwardly in the apparatus. A bypass $d^6$ preferably leads to the pipe D and this is connected with a passage $d^7$ from which there is a minute leak $d^8$, the purpose of which is to assure the filling of the float $g'$ with air. The liquid is carried from the chamber G by a discharge passage $h'$ through a pipe $H'$ to a passage $h^2$ in the bottom $i$ of the chamber I and passes by the bypass $h^3$, uprights $h^4$ to the chamber I. The upright $h^4$ is provided with the lateral openings $h^8$ for the same purpose as heretofore described in connection with the chamber G. The chamber I is preferably about 200 feet long and the same size as the measuring chamber G.

The liquid rising in the chamber I reaches a float $i'$ and raising this float brings a valve $i^2$ onto a seat $j$ of the escape passage J. This escape passage is normally opened and the actuating fluid discharged to the primary chamber and passing through the lower chambers as heretofore described during the filling movement of liquid escapes through this passage. The passage also permits of the escape of air that would otherwise be trapped in the upper end of this chamber by the rising liquid. As soon as this passage is closed the liquid or air trapped in the upper end of the chamber, acting through the passage $h^7$, pipe $H^2$, passage $h^6$, bypass $h^5$ and passage H balances the pressure on the valve $g^3$ permitting this valve to drop. Actuating fluid however may follow the liquid through the discharge pipe $H'$ and actuating fluid may pass by both these ways to the chamber I. The pressure during this action remains continuous, so that both the valve $D^{11}$ and the valve $D^{18}$ are open. The float in the chamber I differs from that in the other chambers in that the cup is not inverted, but is open at the top, so that pressure on its walls is balanced and the collapsing of the float prevented. The cup operates over the outlet passage J, so that in the after movement of the actuating fluid any liquid that may be deposited in the cup is carried out of it through the passage J.

The pressure having been brought on the chamber I, liquid is discharged from said chamber by the passage $j'$ in the bottom $i$ and passes by the pipe $J'$ to the passage $j^2$ in the bottom $k$ of the chamber K and thence by the bypass $j^3$ to the upright $j^4$ by the spreaders $j^5$ into the chamber K. The passage J opens directly into the bypass $j^3$. A check valve $j^6$ prevents the passage of liquid into the passage J and consequently the valve $i^2$ is held to its seat after the liquid has fallen below it by the pressure of the actuating fluid. When however the liquid has been discharged into the chamber K and there is in that chamber the blocking of the escape in the same manner as in the chamber I, the balancing pressure above and below the valve $i^2$ and valve $j^6$ through leakage permits the opening of the valve $i^2$. The air however may follow the liquid through the pipe $J'$. There is however in every case sufficient passage of air through the cup float $i'$ to force out any liquid that may be deposited in it.

The chamber K is similar in construction and operation to that of the chamber $l$. It is provided with the float $k'$, valve $k^2$ and controlling escape passage L. The liquid is discharged through the fitting $l'$, pipe $L'$, passage $l^2$, bypass $l^3$ in the bottom $m$ of the chamber M and passes from the bypass $l^3$ to the upright $l^4$, spreaders $l^5$ to the chamber M. The chamber M is provided with the escape passage N on the bottom of which is the seat $n$. This is operated upon by the valve $m^2$ carried by the float $m'$. A check valve $n^2$ closes the upper end of the escape passage N and the escape passage is connected by a bypass $N^2$ with the discharge $N'$ from the apparatus. This chamber operates substantially the same as the prior chambers with the exception that when pressure is put upon the chamber M after it has been filled with liquid in the manner of the chambers heretofore described, actuating fluid delivered to the upper end of the chamber passes through a pipe $D^{14}$ to the upper end of the chamber $D^2$ thus balancing the pressure on the piston $D^{12}$ so that the spring $D^{13}$ may close that valve. It also delivers actuating fluid by the bypass $D^{15}$ to the under side of the chamber $D^6$ and there acting on the piston $D^9$ balances the pressure on that piston so that the spring $D^{10}$ may close the valve $D^{18}$. The liquid is therefore expelled from the chamber M by the expansion of fluid from the apparatus. As soon as the liquid has passed through the pipe $N'$ the actuating fluid passes the bypass $N^2$ and there is a balancing of pressure on the valve $m^2$ so that the float drops in the manner heretofore described, and actuating fluid then passes both by the escape pipe N and the pipe $N'$ in the further discharge of the liquid.

Any number of stages such as chambers I or K may be provided. It will be noted that while considerable charge may be lifted at each operation of the apparatus, at no place is there a column greater in length than the distance between the bottom of one of these chambers and the top of the succeeding chamber, so that a comparatively low pressure will operate the device.

The operation generally of the device may be described as follows: There is a continuous leak in the primary chamber and there are sufficient avenues of escape so that there is practically no back pressure in the primary chamber, so that it readily fills with liquid. As it is filled with liquid the escape of air is prevented and the pressure rising in the chamber expels the liquid from the chamber. This is preferably facilitated by turning in an added supply, the mechanism for accomplishing this being actuated by the rising pressure. Liquid is discharged from the lower chamber a number of times to fill the storage chamber. With each pumping operation of this lower chamber which does not fill the storage chamber, the avenues of escape remain open so that immediately the charge has been carried through the pressure of the actuating fluid is so reduced as to permit a refilling of the pump chamber. After the filling of the storage chamber a charge of liquid is taken therefrom to the measuring chamber and as soon as the measuring chamber is filled the discharge action from the storage chamber ceases and the pressure being exerted upon the measuring chamber carries the charge, from the measuring chamber by successive stages to the top of the well, the air pressure remaining on the apparatus during this time, and this raising action is facilitated by opening a larger supply connection, and this is accomplished by the added pressure necessary to raise the column from the storage chamber to the measuring chamber. The final discharge is accomplished by the expansion of the actuating fluid. In forming the storage chamber E, it is desirable to provide the coupling $E^3$ so that the fitting containing the bypass $d^2$ may be put in place with the parts readily accessible. After this fitting is put in place and the other parts put together the upper wall of the chamber is secured.

It will be noted that the passage $D^7$ must itself be somewhat restricted, otherwise the frictional resistance in the passage D and the eduction passes would be such as to prevent such a reduction of pressure as would effect the closing of the valve $D^{18}$ after the liquid had been forced from the chamber B. This frictional resistance would so act on the valve $D^{11}$ if it were not for the fact that this valve is closed by turning in the pressure to the pipe $D^{14}$. It will also be noted that the vents or leaks $d^4$ and $d^8$ perform an important function in the apparatus in addition to the function heretofore described, that is the function of supplying the floats with air or actuating fluid, so as to assure a continued buoyancy of the float namely, where the liquid in the well rises to a very high level, it will pass into the apparatus and so fill the chamber B and perhaps additional chambers as the chamber E and chamber G. If it has risen to the level of the chamber G there may not be sufficient air pressure available to lift the liquid from the chamber B through the chamber E and out of the chamber G. The leak $d^8$ however will effect a pumping action of the chamber G independently of the lower chambers and as soon as this pressure is taken from the lower chambers a pumping action will take place in the chamber E through the leak $d^4$, and after this chamber is brought to normal, the pumping will continue as heretofore described. It will also be noted that the eduction tubes, as for instance the eduction tube $C'$, is very small in cross area as compared with the chamber B. In order therefore to force sufficient liquid from the chamber B to make any great difference in its action on the float a considerable column must be raised in the eduction tube $C'$ so that the pressure in the chamber rises very fast as compared with the receding of the liquid from the float, thus assuring the seating of the valve through the pressure of actuating fluid as the liquid is withdrawn from the chamber. This same action of course is present in the other chambers.

It will be noted that the outlet from the series of check valves into the chamber B is above the bottom of the eduction tube $C''$. By this arrangement any sand that may be passed into the chamber B with the liquid and settling to the bottom of the chamber is carried out through the eduction tube and does not fill up the chamber to a point where the sand will accumulate on the valve $b$.

What I claim as new is:—

1. In an apparatus for actuating liquids, the combination of a pumping chamber; a connection for conveying actuating fluid to said chamber; means for conducting liquid to said chamber; means for permitting the escape of actuating fluid as it is admitted during the filling movement of liquid; and means for cutting off the escape of actuating fluid to expel the liquid therefrom.

2. In an apparatus for actuating liquids, the combination of a pumping chamber; a connection for conveying the actuating fluid continuously to said chamber; means for conveying liquid to said chamber; means for permitting the escape of actuating fluid during the filling movement of liquid; and means for cutting off the escape of actuating fluid to expel the liquid.

3. In an apparatus for actuating liquids, the combination of a pump chamber; means for conducting liquid to said chamber; means for permitting the escape of actuating fluid during a filling movement of liquid; means for conveying actuating fluid to said chamber in small volume during the filling movement of liquid; and means for cutting off the escape of actuating fluid to expel the liquid.

4. In an apparatus for actuating liquids, the combination of a pump chamber; a connection for conveying actuating fluid to said chamber, said connection containing a restricted passage to restrict the passage of actuating fluid through it; means for conveying liquid to said chamber; means for permitting the escape of actuating fluid as it is admitted during the filling movement of liquid; and means for cutting off the escape of actuating fluid to expel the liquid therefrom.

5. In an apparatus for actuating liquids, the combination of a pump chamber; a connection for conveying actuating fluid to said chamber; means for conducting liquid to said chamber; means for permitting the escape of actuating fluid as it is admitted during the filling movement of liquid; and means actuated by the liquid entering the chamber for cutting off the escape of actuating fluid to expel the liquid from the chamber.

6. In an apparatus for actuating liquids, the combination of a pumping chamber; a connection for conveying the actuating fluid continuously to said chamber; means for conveying liquid to said chamber; means for permitting the escape of actuating fluid during the filling movement of liquid; and means actuated by the liquid entering the chamber for cutting off the escape of actuating fluid to expel the liquid from the chamber.

7. In an apparatus for actuating liquids, the combination of a pump chamber; means for conducting liquid to said chamber; means for permitting the escape of actuating fluid during a filling movement of liquid; means for conveying actuating fluid in small volume during the filling movement of liquid; and means actuated by the liquid entering the chamber for cutting off the escape of actuating fluid to expel the liquid from the chamber.

8. In an apparatus for actuating liquids, the combination of a pump chamber; a connection for conveying actuating fluid to said chamber; means for conveying liquid to said chamber; means for permitting the escape of actuating fluid as it is admitted to said chamber during the filling movement of liquid; a valve controlling said means of escape; and a float controlling said valve.

9. In an apparatus for actuating liquids, the combination of a pump chamber; a connection for conveying actuating fluid continuously to said chamber; means for conducting liquid to said chamber; means for permitting the escape of actuating fluid during the filling movement of liquid; a valve controlling said means of escape; and a float controlling said valve.

10. In an apparatus for actuating liquids, the combination of a pump chamber; means for conveying liquid to said chamber; a connection for conveying actuating fluid to said chamber; means for permitting the escape of actuating fluid as it is admitted during the filling movement of the liquid; means for cutting off the escape to expel the liquid from the chamber arranged to open the means of escape after the expulsion of liquid.

11. In an apparatus for actuating liquids, the combination of a pump chamber; means for conveying liquid to said chamber; a connection for conveying actuating fluid continuously to said chamber; means for permitting the escape of actuating fluid as it is admitted during the filling movement of the liquid; means for cutting off the escape to expel the liquid from the chamber arranged to open the means of escape after the expulsion of liquid.

12. In an apparatus for actuating liquids, the combination of a pump chamber; means for conveying liquid to said chamber; a connection for conveying actuating fluid to said chamber; means for permitting the escape of actuating fluid as it is admitted during the filling movement of the liquid; and means actuated by the liquid entering the chamber for cutting off the escape of actuating fluid to expel the liquid from the chamber.

13. In an apparatus for actuating liquids, the combination of a pump chamber; means for conveying liquid to said chamber; a connection for conveying actuating fluid to said chamber; means for permitting the escape of actuating fluid as it is admitted during the filling movement of the liquid; a valve to close said means arranged to expel the liquid arranged to remain seated during the expulsion of the liquid and to open after the expulsion of liquid.

14. In an apparatus for actuating liquids, the combination of a pump chamber; means for conveying liquid to said chamber; a connection for conveying actuating fluid to said chamber; means for permitting the escape of actuating fluid as it is admitted during the filling movement of the liquid; a valve to close said means arranged to expel the liquid arranged to remain seated during the expulsion of the liquid and to open after the expulsion of liquid; and a float arranged to close said valve.

15. In an apparatus for actuating liquids, the combination of a pump chamber, means for conveying liquid to said chamber; a connection for conveying actuating fluid to said chamber; means for permitting the escape of actuating fluid as it is admitted during the filling movement of the liquid; a valve to close said escape to expel the liquid, arranged to remain seated under the action of pressure during the expulsion of liquid; and means for balancing the pressure on said valve after the expulsion of liquid from the chamber to open said valve.

16. In an apparatus for actuating liquids, the combination of a pump chamber; a connection for conveying actuating fluid to said chamber; means for conveying liquid to said chamber; means for permitting the escape of actuating fluid as it is admitted to said chamber during the filling movement of liquid; a valve controlling said means of escape; and a cup shaped float controlling said valve.

17. In an apparatus for actuating liquids, the combination of a pump chamber; a connection for conveying actuating fluid to said chamber; means for conveying liquid to said chamber; means for permitting the escape of actuating fluid as it is admitted to said chamber during the filling movement of liquid; a valve controlling said means of escape; and an inverted cup shaped float controlling said valve.

18. In an apparatus for actuating liquids, the combination of a pump chamber; a connection for conveying actuating fluid to said chamber; means for conveying liquid to said chamber; means for permitting the escape of actuating fluid as it is admitted to said chamber during the filling movement of liquid; a valve controlling said means of escape; and a cup shaped float controlling said valve, said float being arranged in the line of movement of actuating fluid.

19. In an apparatus for actuating liquids, the combination of a pump chamber; a connection for conveying actuating fluid to said chamber; means for conveying liquid to said chamber; means for permitting the escape of actuating fluid as it is admitted to said chamber during the filling movement of liquid; a valve controlling said means of escape; and an inverted cup shaped float controlling said valve, said float being arranged in the line of actuating fluid.

20. In an apparatus for actuating liquids, the combination of a pump chamber; means for conveying liquid to said chamber; a connection for conveying actuating fluid to said chamber; means for permitting the escape of actuating fluid as it is admitted during the filling movement of the liquid; a valve to close said means of escape to expel the liquid, and arranged to remain seated during the expulsion of the liquid; a cup shaped float for closing said valve; and means for balancing the pressure on said valve after the expulsion of the liquid from the chamber to open said valve.

21. In an apparatus for actuating liquids, the combination of a pump chamber; a connection for conveying liquids to said chamber; means for conducting actuating fluid to said chamber; devices for permitting the escape of actuating fluid as it is admitted, during the filling movement of the liquid; a cup shaped float for controlling said devices, said float being arranged in the line of movement of actuating fluid.

22. In an apparatus for actuating liquids, the combination of a pump chamber; a connection for conveying actuating fluid to said chamber; means for conducting liquid to said chamber; a valve controlled escape for permitting the escape of actuating fluid from said chamber; a cup shaped float controlling said escape, the parts being arranged and proportioned to maintain the valve in a closed position through the action of actuating fluid.

23. In an apparatus for actuating liquids, the combination of a pump chamber; a connection for conveying actuating fluid to said chamber; means for conducting liquid to said chamber; a valve controlled escape for permitting the escape of actuating fluid from said chamber; an inverted cup shaped float controlling said escape, the parts being arranged and proportioned to maintain the valve in a closed position through the action of actuating fluid.

24. In an apparatus for actuating liquid, the combination of a pump chamber; a connection for conveying actuating fluid to said chamber; means for permitting the escape of actuating fluid as it is admitted during the filling movement of liquid; means for cutting off the escape to expel the liquid; and means for conveying liquid to said chamber comprising a plurality of check valves through which said liquid passes.

25. In an apparatus for actuating liquids, the combination of a pump chamber; means for conveying a liquid to said chamber; a connection for conducting actuating fluid to said chamber; and mechanism actuated through an increase in pressure in said connection for turning into said connection a supply of actuating fluid.

26. In an apparatus for actuating liquids, the combination of a pump chamber; means for conveying a liquid to said chamber; a connection for conducting actuating fluid to said chamber; and mechanism actuated by fluid in said connection varying in pressure with the change of the liquid level in the pump chamber for turning into said connection a supply of actuating fluid.

27. In an apparatus for actuating liquids, the combination of a pump chamber; a connection for conveying an actuating fluid to said chamber; means for conducting liquid to said chamber; means for permitting the escape of actuating fluid as it is admitted during the filling movement of liquid; means for cutting off the escape to expel the liquid therefrom; and mechanism actuated by the increase of pressure incident to the cutting off of said escape for turning a supply of actuating fluid into said chamber.

28. In an apparatus for actuating liquids, the combination of a pump chamber; a connection for conveying an actuating fluid to said chamber; means for conducting liquid to said chamber; means for permitting the escape of actuating fluid as it is admitted during the filling movement of liquid; means for cutting off the escape to expel the liquid therefrom; and mechanism actuated by the increase of pressure incident to the cutting off of said escape for turning a supply of actuating fluid through said connection into said chamber.

29. In an apparatus for actuating liquids, the combination of a pump chamber; a connection for conveying an actuating fluid to said chamber; means for conducting liquid to said chamber; means for permitting the escape of actuating fluid as it is admitted during the filling movement of liquid; means for cutting off the escape to expel the liquid therefrom; mechanism actuated by the increase of pressure incident to the cutting off of said escape for turning a supply of actuating fluid into said chamber; and means for opening said means of escape after the expulsion of liquid from said chamber.

30. In an apparatus for actuating liquids, the combination of a pump chamber; a connection for conveying an actuating fluid to said chamber; means for conducting liquid to said chamber; means for permitting the escape of actuating fluid as it is admitted during the filling movement of liquid; means for cutting off the escape to expel the liquid therefrom; mechanism actuated by the increase of pressure incident to the cutting off of said escape for turning a supply of actuating fluid through said connection into said chamber; and means for opening said means of escape after the expulsion of liquid from said chamber.

31. In an apparatus for actuating fluids, the combination of a pump chamber; a connection for conveying actuating fluid continuously to said chamber; means for conveying liquid to said chamber; means for permitting the escape of actuating fluid during the filling movement of the liquid; means for cutting off the escape to expel the liquid; and means for admitting an added supply of actuating fluid during the expulsion of liquid.

32. In an apparatus for actuating liquids, the combination of a pump chamber; a connection for conveying actuating fluid continuously to said chamber; means for conveying liquid to said chamber; means for permitting the escape of actuating fluid during the filling movement of the liquid; means for cutting off the escape to expel the liquid; means for admitting an added supply of actuating fluid during the expulsion of liquid; and means for opening said means of escape after the expulsion of liquid.

33. In an apparatus for actuating liquids, the combination of a pump chamber; means for conducting liquid to said chamber; means for permitting the escape of actuating fluid during a filling movement of liquid; means for conveying to said chamber actuating fluid in small volume during the filling movement of the liquid; means for cutting off the actuating fluid to expel the liquid; and means for admitting an additional supply of actuating fluid during the expelling movement.

34. In an apparatus for actuating liquids, the combination of a pump chamber; a connection for conveying the actuating fluid continuously to said chamber; means for conveying liquid to said chamber; means for permitting the escape of actuating fluid during the filling movement of liquid; means for cutting off the escape to expel the liquid; and mechanism actuated by the increase of pressure incident to the cutting off of said escape for turning a supply of actuating fluid into said chamber.

35. In an apparatus for actuating liquids, the combination of a pump chamber; a connection for conveying the actuating fluid continuously to said chamber; means for conveying liquid to said chamber; means for permitting the escape of actuating fluid during the filling movement of liquid; means for cutting off the escape to expel the liquid; mechanism actuated by the increase of pressure incident to the cutting off of said escape for turning a supply of actuating fluid into said chamber; and means for opening said means of escape after the expulsion of liquid.

36. In an apparatus for actuating liquids, the combination of a pump chamber; means for conveying a liquid to said chamber; a connection for conducting actuating fluid to said chamber; and mechanism located at a point remote from said pump chamber and actuated through an increase in pressure in said connection for turning into said connection a supply of actuating fluid.

37. In an apparatus for actuating liquids, the combination of a pump chamber; means for conveying a liquid to said chamber; a connection for conducting actuating fluid to said chamber; and mechanism located at a point remote from said chamber and actuated by fluid in said connection varying in pressure with the change of the liquid level in the pump chamber for turning into said connection a supply of actuating fluid.

38. In an apparatus for actuating liquids, the combination of a pump chamber; a connection for conveying an actuating fluid to said chamber; means for conducting liquid to said chamber; means for permitting the escape of actuating fluid as it is admitted during the filling movement of liquid; means for cutting off the escape to expel the liquid therefrom; and mechanism located at a point remote from said chamber and actuated by the increase of pressure incident to the cutting off of said escape for turning a supply of actuating fluid into said chamber.

39. In an apparatus for actuating liquids, the combination of a pump chamber; means for conducting liquid to said chamber; means for conveying actuating fluid to said chamber; means comprising a restricted passage to wiredraw the actuating fluid; means for permitting the escape of actuating fluid as it is admitted during the filling movement of the actuated fluid; means for cutting off the escape to expel the liquid; and mechanism located at a point remote from said chamber for turning in a supply of actuating fluid after the cutting off of the escape.

40. In an apparatus for actuating liquids, the combination of a pump chamber; the connection D for supplying actuating fluid to said chamber; the restricted passage $D^3$ through which the actuating fluid passes to said connection; means of escape C from said chamber; and a float controlled valve $b^5$ for closing said escape as the liquid rises in said chamber.

41. In an apparatus for actuating liquids, the combination of a pump chamber; the connection D for supplying actuating fluid to said chamber; the restricted passage $D^3$ through which the actuating fluid passes to said connection; means of escape C from said chamber; a float controlled valve $b^5$ for closing said escape as the liquid rises in said chamber; the secondary valve $D^{18}$; a motor for controlling said valve; the connection $D^4$ between the motor and the connection D, said motor being arranged to operate to open the valve on the increase of pressure in the connection D incident to the closing of the escape; and the connection $D^7$ controlled by the valve $D^{18}$ and arranged to convey actuating fluid to the connection $D^4$ and D when the valve $D^{18}$ is open.

42. In an apparatus for actuating liquids, the combination of a pump chamber; the escape C therefrom; the float controlled valve controlling said means of escape; the pipe D forming a connection for actuating fluid; the supplemental supply pipe D⁴; a valve D¹⁸ controlling the connection to the supplemental supply; a motor controlling the valve D¹⁸, said motor being subjected to the pressure of the connection D and operating only after the closing of said escape.

43. In an apparatus for actuating liquids, the combination with a pump chamber; means for conveying liquid into said chamber; a connection for conveying actuating fluid to said chamber; a secondary chamber into which the liquid is pumped; and a connection between said chambers for permitting an overflow to said pump chamber when a charge exceeds the capacity of the secondary chamber.

44. In an apparatus for actuating liquids, the combination with a pump chamber; means for conveying liquid into said chamber; a connection for conveying actuating fluid to said chamber; a secondary chamber into which the liquid is pumped; and a connection normally carrying the actuating fluids between said chambers for permitting an overflow to said pump chamber when a charge exceeds the capacity of the secondary chamber.

45. In an apparatus for actuating liquids, the combination of a pump chamber; a connection for conveying actuating fluid to said chamber; means for conveying liquid to said chamber; means for permitting the escape of actuating fluid during the filling movement of liquid; means for cutting off the escape to expel the liquid therefrom; and a secondary chamber into which the liquid is pumped from the pump chamber, the secondary chamber being connected with said means of escape, and said means of escape forming an actuating fluid connection between said chambers.

46. In an apparatus for actuating liquids, the combination of a pump chamber; a connection for conveying actuating fluid to said chamber; means for conducting liquid to said chamber; means for permitting the escape of actuating fluid as it is admitted during the filling movement of liquid; means for cutting off the escape to expel the liquid therefrom; a secondary chamber into which liquid is pumped; a connection from the top of said secondary chamber leading to said means of escape and permitting an overflow from said secondary chamber when the charge is excessive.

47. In an apparatus for actuating liquids, the combination of a pump chamber; a connection for conveying actuating fluid to said chamber; means for conveying liquid to said chamber; means for permitting the escape of actuating fluid during the filling movement of liquid; means for cutting off the escape to expel the liquid therefrom; and a secondary chamber into which the liquid is pumped from the pump chamber, the secondary chamber being connected with said means of escape and said means of escape forming an actuating fluid connection between said chambers; and a means for permitting an overflow when the charge from the pump chamber to the secondary chamber is excessive.

48. In an apparatus for actuating liquids, the combination of a pumping chamber; a connection for conveying actuating fluid to said chamber; means for conducting liquid to said chamber; means for permitting the escape of actuating fluid as it is admitted during the filling movement of liquid; a valve mechanism controlling said means of escape; a secondary chamber into which liquid is pumped, said chamber being connected with said means of escape, and forming a connection for opening said valve mechanism.

49. In an apparatus for actuating liquids, the combination of a pump chamber; a connection for conveying actuating fluid to said chamber; means for conducting liquid to said chamber; means for permitting the escape of actuating fluid as it is admitted during the filling movement of liquid; a valve mechanism controlling said means of escape; a secondary chamber into which liquid is pumped, said chamber being connected with said means of escape, and forming a connection for balancing through said means of escape the pressure on the valve to open said valve.

50. In an apparatus for actuating liquids, the combination of a pump chamber; a connection for conveying actuating fluid to said chamber; means for conducting liquid to said chamber; means for permitting the escape of actuating fluid as it is admitted during the filling movement of liquid; a valve mechanism controlling said means of escape; a secondary chamber into which liquid is pumped, said chamber being connected with said means of escape, and forming a connection for opening said valve, said means of escape being arranged to take the overflow from the secondary chamber to the pump chamber when a charge more than sufficient to fill said secondary chamber is pumped into it.

51. In an apparatus for actuating liquids, the combination of a pump chamber; a connection for conveying actuating fluid to said chamber; means for conducting liquid to said chamber; means for permitting the escape of actuating fluid as it is admitted during the filling movement of liquid; a valve mechanism controlling said escape; a secondary chamber into which liquid is pumped said chamber being connected with said means of escape and forming a connection for opening said valve; and a float for closing said valve as the chamber is filled.

52. In an apparatus for actuating liquids, the combination of a pump chamber; a connection for conveying the actuating fluid continuously to said chamber; means for conveying liquid to said chamber; means for permitting the escape of actuating fluid during the filling movement of liquid; means for cutting off the escape to expel the liquid; and a secondary chamber into which the liquid is pumped said secondary chamber being connected with said means of escape and said means of escape forming an actuating fluid connection between said chambers.

53. In an apparatus for actuating liquids, the combination of a pump chamber; a connection for conveying the actuating fluid continuously to said chamber; means for conveying liquid to said chamber; means for permitting the escape of actuating fluid during the filling movement of liquid; a valve mechanism controlling said escape; a float controlling said valve; and a secondary chamber into which said liquid is pumped, said chamber being connected with said means of escape and forming a connection to open said valve.

54. In an apparatus for actuating liquids, the combination of the pump chambers B and E; the liquid connection C' between them; the connection C extending to the upper end of the chamber E and forming a means of escape for the chamber B; a connection D for supplying actuating fluid continuously to the chamber B; a valve $b^5$ controlling the passage C; and the float $b^3$ controlling the valve $b^5$.

55. In an apparatus for actuating liquids, the combination of a pump chamber; the escape C therefrom; the float controlled valve controlling said means of escape; the pipe D forming a connection for actuating fluid; the supplemental supply $D^4$; a valve $D^{18}$ controlling the connection to the supplemental supply; a secondary chamber into which the liquid is pumped, said secondary chamber having a capacity to receive a plurality of charges from the pump chamber.

56. In an apparatus for actuating liquids, the combination with a pump chamber; means for conveying liquid into said chamber; a secondary chamber into which the liquid is pumped, means for supplying actuating fluid to the pump chamber; a connection normally carrying the actuating fluid from the pump chamber to the secondary chamber forming a connection between said chambers for permitting an overflow to said pump chamber when a charge exceeds the capacity of the secondary chamber, said secondary chamber having a capacity to receive a plurality of charges from the pump chamber.

57. In an apparatus for actuating liquids, the combination of a primary pump chamber; a secondary pump chamber connected therewith; means for conducting liquid to the primary chamber and from the primary chamber to the secondary chamber; connections for supplying actuating fluid to said secondary chamber; means for permitting the escape of actuating fluid from said secondary chamber until filled; and means for cutting off the escape to expel the liquid.

58. In an apparatus for actuating liquids, the combination of a primary pump chamber; a secondary pump chamber connected therewith, said secondary chamber having a capacity to receive a plurality of charges from the primary pump chamber; means for conducting liquid to the primary chamber and from the primary chamber to the secondary chamber; connections for supplying actuating fluid to said secondary chamber; means for permitting the escape of actuating fluid from said secondary chamber until filled; and means for cutting off the escape to expel the liquid.

59. In an apparatus for actuating liquid, the combination of a primary pump chamber; a secondary pump chamber connected therewith; means for conducting liquid to the primary chamber and from the primary chamber to the secondary chamber; connections for supplying actuating fluid to said secondary chamber; means for permitting the escape of actuating fluid from said secondary chamber until filled; and means actuated by the liquid entering the secondary chamber for cutting off the escape to expel the liquid from said secondary chamber.

60. In an apparatus for actuating liquids, the combination of a primary pump chamber; means for permitting the escape of actuating fluid from said chamber during the filling movement of liquid; means for supplying actuating fluid to said chamber; means for cutting off said means of escape to expel the liquid from said chamber; a secondary chamber into which said liquid is expelled; means of escape for actuating fluid from said secondary chamber; and means for cutting off said means of escape from the secondary chamber for expelling the liquid therefrom.

61. In an apparatus for actuating liquids, the combination of a primary pump chamber; means for permitting the escape of actuating fluid from said chamber during the filling movement of liquid; means for supplying actuating fluid to said chamber; means for cutting off said means of escape to expel the liquid from said chamber; a secondary chamber into which said liquid is expelled; means of escape for actuating fluid from said secondary chamber; means for cutting off said means of escape from the secondary chamber for expelling the liquid therefrom; and a connection between the means of escape of the primary chamber and said secondary chamber.

62. In an apparatus for actuating liquids, the combination of a primary pump chamber; means for permitting the escape of actuating fluid from said chamber during the filling movement of liquid; means for supplying actuating fluid continuously to said chamber; means for cutting off said means of escape to expel the liquid from said chamber; a secondary chamber into which said liquid is expelled; means of escape for actuating fluid from said secondary chamber; means for cutting off said means of escape from the secondary chamber for expelling the liquid therefrom.

63. In an apparatus for actuating liquids, the combination of a primary pump chamber; a secondary pump chamber connected therewith; means for conducting liquid to the primary chamber and from the primary chamber to the secondary chamber; connections for supplying actuating fluid to said secondary chamber; means for permitting the escape of actuating fluid from said secondary chamber until filled; a valve arranged to close said means of escape to expel the liquid from said secondary chamber, and arranged to open after the expulsion of the liquid from said secondary chamber.

64. In an apparatus for actuating liquids, the combination of a primary chamber; means for supplying actuating fluid thereto; means for permitting the escape of actuating fluid therefrom; a valve controlling said means of escape to close said means of escape to expel the liquid from said chamber and to open after the expulsion of said liquid to permit the entering of a fresh supply of liquid; a secondary chamber into which said liquid is expelled; means of escape for actuating fluid during the filling movement from the secondary chamber; means for supplying actuating fluid to said secondary chamber; a valve controlling the means of escape arranged to close said means of escape to expel the liquid from said chamber and to open after the expulsion of the liquid.

65. In an apparatus for actuating liquids, the combination of a primary pump chamber; a secondary pump chamber connected therewith; means for conducting liquid to the primary chamber and from the primary chamber to the secondary chamber; connections for supplying actuating fluid to said secondary chamber; means for permitting the escape of actuating fluid from said secondary chamber until filled; a valve for closing said means of escape, said valve arranged to remain seated during the expulsion of the liquid through the action of pressure of the actuating fluid and to open after the expulsion of liquid; and a float for closing said valve.

66. In an apparatus for actuating liquids, the combination of a primary pump chamber; means for supplying actuating fluid thereto; means for permitting the escape of actuating fluid therefrom during the filling movement of liquid to said chamber; a valve controlling said means of escape, said valve being arranged to remain seated during the expulsion of the liquid through the action of pressure of the actuating fluid; a float for closing said valve; a secondary chamber into which the liquid is expelled; a connection between said means of escape and said secondary chamber; a liquid connection between said primary and secondary chambers; means for permitting the escape of actuating fluid through the secondary chamber; a valve for controlling said means of escape from the secondary chamber, said valve being arranged to remain seated through the action of actuating fluid during the expulsion of liquid and to open after the expulsion of liquid; and a float in the secondary chamber for closing the valve controlling means of escape from the secondary chamber.

67. In an apparatus for actuating liquids, the combination of the pump chamber B having the connection for permitting the escape of actuating fluid C; a connection D for supplying actuating fluid; the valve $b^5$ controlling the connection C; the float $b^3$ controlling the valve $b^5$; a secondary chamber E; a liquid connection C' between said chambers; a connection F for permitting the escape of actuating fluid from the chamber E; the valve $e'$ controlling said means of escape; the float $e$ for actuating the valve; and the connection C extending to the top of the chamber E.

68. In an apparatus for actuating liquids, the combination of a pump chamber elongated in a vertical direction and arranged to have liquid expelled from it by the direct action of actuating fluid upon the liquid; means for delivering liquid to said chamber near its top in a direction to bring said liquid into contact with surfaces leading toward the bottom of the chamber to prevent an unretarded drop of liquid to the level of liquid in the chamber.

69. In an apparatus for actuating liquids, the combination of a primary pump chamber; a secondary pump chamber arranged to receive successive charges through a liquid connection from the primary chamber and then to be discharged; connections for conveying actuating fluid to said primary chamber and from the primary chamber to the secondary chamber, independently of the liquid connection; and means for automatically discharging said chambers as they become filled through the action of the actuating fluid.

70. In an apparatus for actuating liquids, the combination of a primary pump chamber; a secondary pump chamber arranged to receive successive charges through a liquid connection from the primary chamber and then to be discharged; connections for conveying actuating fluid to said primary chamber and from the primary chamber to the secondary chamber, independently of the liquid connection; means for automatically discharging said chambers as they become filled through the action of the actuating fluid; and mechanism actuated through said actuating fluid connection for turning in an added supply during the expulsion of liquid.

71. In an apparatus for actuating liquids, the combination of a primary pump chamber; a secondary pump chamber arranged to receive successive charges through a liquid connection from the primary chamber and then to be discharged; connections for conveying actuating fluid to said primary chamber and from the primary chamber to the secondary chamber, independently of the liquid connection; means for automatically discharging said chambers as they become filled through the action of the actuating fluid; and mechanism actuated by fluid in said connection for conveying actuating fluid to the primary chamber for turning into said connection a supply of actuating fluid.

72. In an apparatus for actuating liquids, the combination of a primary pump chamber; a connection for conveying actuating fluid to said chamber; means of escape from said chamber to a secondary chamber; said secondary chamber; a liquid connection between said primary chamber and said secondary chamber; means for cutting off said escape to expel the liquid from the primary chamber to the secondary chamber; means for opening said means of escape upon the filling of the secondary chamber and delivering the actuating fluid active in the expulsion of liquid from the primary chamber to the secondary chamber to said means of escape.

73. In an apparatus for actuating liquids, the combination of a primary pump chamber; a secondary pump chamber connected therewith; means for conducting liquid to the primary chamber and from the primary chamber to the secondary chamber; connections for supplying actuating fluid to said secondary chamber; means for permitting the escape of actuating fluid from said secondary chamber until filled; means for cutting off the escape to expel the liquid; and mechanism acting through the connection for supplying actuating fluid to said secondary chamber for turning in an added supply of actuating fluid.

74. In an apparatus for actuating liquids, the combination of a primary pump chamber; a secondary pump chamber connected therewith; means for conducting liquid to the primary chamber and from the primary chamber to the secondary chamber; connections for supplying actuating fluid to said secondary chamber; means for permitting the escape of actuating fluid from said secondary chamber until filled; means for cutting off the escape to expel the liquid; and mechanism actuated by fluid in the connection for supplying actuating fluid for turning in an added supply of actuating fluid during the expulsion of liquid from said secondary chamber.

75. In an apparatus for actuating liquids, the combination of a primary pump chamber; a secondary chamber into which liquid is pumped from the primary chamber; connections for conveying actuating fluid to said secondary chamber; means of escape from said secondary chamber; means for cutting off said means of escape to expel the liquid from said secondary chamber; and mechanism actuated by the pressure in said chamber after the cutting off of the escape for turning in an added supply of actuating fluid.

76. In an apparatus for actuating liquids, the combination of a primary pump chamber; the actuating fluid connection D; the restricted passage $D^3$ leading to said connection; the escape C leading from the primary chamber to the secondary chamber E; the liquid connection $C'$ between said chambers; the valve $D^{18}$; mechanism for actuating said valve to open the same through the pressure incident to lifting the column through the connection $C'$; the lift from the secondary chamber; the valve $D^{11}$; and mechanism for actuating said valve $D^{11}$ through the pressure on the connection D incident to raising liquid through the lift from the secondary chamber.

77. In an apparatus for actuating liquids, the combination of a primary pump chamber; the actuating fluid connection D; the restricted passage $D^3$ leading to said connection; the escape C leading from the primary chamber to the secondary chamber E; the liquid connection $C'$ between said chambers; the valve $D^{18}$; mechanism for actuating said valve to open the same through the pressure incident to lifting the column through the connection $C'$; the lift from the secondary chamber E; the valve $D^{11}$; and mechanism for actuating said valve $D^{11}$ through the pressure on the connection D incident to raising liquid through the lift from the secondary chamber, said valves $D^{18}$ and $D^{11}$ being located at a point remote from said chambers.

78. In an apparatus for actuating liquids, the combination of a primary pump chamber; means for conducting liquid into said chamber; a secondary pump chamber; a liquid connection between said chambers; means for supplying actuating fluid to said chambers; means for permitting the escape of actuating fluid from said secondary chamber; means for cutting off said means of escape as the secondary chamber becomes filled to expel the liquid therefrom; and a connection between the chambers to permit an overflow from the secondary to the primary chamber when a charge more than sufficient to fill the secondary chamber is delivered to it.

79. In an apparatus for actuating liquids, the combination of a primary pump chamber; means for conducting liquid into said chamber; a secondary pump chamber; a liquid connection between said chambers; means for supplying actuating fluid to said chambers, the secondary chamber being supplied through the primary chamber; means for permitting the escape of actuating fluid from said secondary chamber; means for cutting off said means of escape as the secondary chamber becomes filled to expel the liquid therefrom; and a connection between the chambers to permit an overflow from the secondary to the primary chamber when a charge more than sufficient to fill the secondary chamber is delivered to it.

80. In an apparatus for actuating liquids, the combination of a primary pump chamber; means for conducting liquid in said chamber; a secondary pump chamber; a liquid connection between said chambers; means for supplying actuating fluid to the primary chamber; an actuating fluid connection between said chambers; means for the escape of actuating fluid from the secondary chamber; and means actuated by the liquid entering the secondary chamber for cutting off said means of escape to expel the liquid therefrom; an actuating fluid connection between said chambers forming an overflow from the secondary to the primary chamber; and means for stopping the pumping action from the primary to the secondary chamber when the secondary chamber is filled.

81. In an apparatus for actuating liquids, the combination of a primary pump chamber; means for conducting liquid into said chamber; a secondary pump chamber; a liquid connection between said chambers; means for supplying actuating fluid to said chambers; means for permitting the escape of actuating fluid from said secondary chamber; means for cutting off said means of escape as the secondary chamber becomes filled to expel the liquid therefrom; a connection between the chambers to permit an overflow from the secondary to the primary chamber when a charge more than sufficient to fill the secondary chamber is delivered to it; and mechanism for opening said means of escape after the expulsion of liquid from said secondary chamber.

82. In an apparatus for actuating liquids, the combination of a primary pump chamber; means for conducting liquid into said chamber; a secondary pump chamber; a liquid connection between said chambers; means for supplying actuating fluid to said chambers; means for permitting the escape of actuating fluid from said secondary chamber; means for cutting off said means of escape as the secondary chamber becomes filled to expel the liquid therefrom; a connection between the chambers to permit an overflow from the secondary to the primary chamber when a charge more than sufficient to fill the secondary chamber is delivered to it; and mechanism for turning on a supply during the expulsion of liquid from said secondary chamber; and devices for opening the means of escape from said secondary chamber and closing said added supply after the expulsion of liquid therefrom.

83. In an apparatus for actuating fluids, the combination of a primary pump chamber; a secondary pump chamber; a liquid connection for conveying liquid from the primary chamber to the secondary chamber; an actuating fluid connection between said chambers independent of the liquid connection; means for controlling said connections to force the liquid from the primary to the secondary chamber and from the secondary chamber by actuating fluid delivered to the primary chamber.

84. In an apparatus for actuating liquids, the combination of a primary pump chamber; a secondary pump chamber; a liquid connection for conveying liquid from the primary chamber to the secondary pump chamber; an actuating fluid connection between said chambers; means for closing said actuating fluid connection during the expulsion of liquid from the primary chamber and opening said connection during the expulsion of fluid from the secondary chamber; and means for supplying actuating fluid to the primary chamber during the expulsion of liquid from the secondary chamber.

85. In an apparatus for actuating liquids, the combination of a primary pump chamber; a series of pump chambers above the primary pump chamber; a liquid connection between said chambers; an independent fluid connection between said chambers; means for controlling said independent fluid connections to discharge liquid from said chambers successively by a following action of the actuated fluid through the lifts, the actuating fluid being delivered through the primary chamber and through said independent actuating fluid connections.

86. In an apparatus for actuating liquids, the combination of a primary pump chamber; a secondary pump chamber; a liquid connection for conveying liquid from the primary to the secondary pump chamber; an actuating fluid connection between said chambers; means controlling said connections to force the liquid from the primary to the secondary chamber and from the secondary chamber by actuating fluid delivered to the primary chamber; means for supplying actuating fluid to the primary chamber continuously, said actuating fluid escaping through the secondary chamber during the filling action of the primary chamber.

87. In an apparatus for actuating liquids, the combination of a primary pump chamber; a secondary pump chamber; a liquid connection for conveying liquid from the primary to the secondary pump chamber; an actuated fluid connection between said chambers; means controlling said connections to force the liquid from the primary to the secondary chamber and from the secondary chamber by actuating fluid delivered to the primary chamber; means for supplying actuating fluid to the primary chamber continuously, said actuating fluid escaping through the secondary chamber during the filling action of the primary chamber; and mechanism for automatically increasing the supply of actuating fluid during the expelling movement.

88. In an apparatus for actuating liquids, the combination of a primary pump chamber; a secondary pump chamber; a liquid connection for conveying liquid from the primary to the secondary pump chamber; an actuated fluid connection between said chambers; means controlling said connections to force the liquid from the primary to the secondary chamber and from the secondary chamber by actuating fluid delivered to the primary chamber; means for supplying actuating fluid to the primary chamber continuously, said actuating fluid escaping through the secondary chamber during the filling action of the primary chamber; and mechanism for increasing the supply of actuating fluid during the expulsion of liquid from the primary chamber and further increasing the supply during the expulsion of liquid from the secondary chamber.

89. In an apparatus for actuating liquids, the combination of a primary pump chamber; a series of pump chambers through which liquid is carried successively from the primary pump chamber; independent actuating fluid connections between said chambers; means for controlling said connections to force the liquid from the primary chamber through the chambers successively by actuating fluid delivered to the primary chamber; means for supplying actuating fluid to the primary chamber, the actuating fluid connection between the chambers being arranged to permit the escape of actuating fluid from the primary chamber through said successive chambers during the filling movement of liquid to the primary chamber.

90. In an apparatus for actuating liquids, the combination of a primary pump chamber; a plurality of pump chambers into which liquid is pumped successively from the primary pump chamber; means for supplying the primary pump chamber continuously with actuating fluid; means for adding to the volume of actuating fluid during the expelling movement, said means being arranged to maintain this added supply during the expulsion of liquid through the successive chambers.

91. In an apparatus for actuating liquids, the combination of a primary pump chamber; a plurality of pump chambers into which liquid is pumped successively from the primary pump chamber; means for supplying the primary pump chamber continuously with actuating fluid; means for adding to the volume of actuating fluid during the expelling movement, said means being arranged to maintain this added supply during the expulsion of liquid through the successive chambers, said mechanism being arranged at a point remote from said primary chamber.

92. In an apparatus for actuating liquids, the combination of a first pump chamber; a succeeding pump chamber into which the liquid is pumped from the first pump chamber, the succeeding chamber being smaller than the first pump chamber; means for stopping the pumping action from the first to the succeeding pump chamber when the succeeding pump chamber becomes filled; and means for expelling the liquid from the succeeding pump chamber, the pumping action in said chambers being effected by the direct action of an actuating fluid upon the liquid.

93. In an apparatus for actuating liquids, the combination of a first pump chamber; a succeeding pump chamber into which the liquid is pumped from the first pump chamber, the succeeding chamber being smaller than the first pump chamber; means for stopping the pumping action from the first to the succeeding pump chamber when the succeeding pump chamber becomes filled, the pumping action upon the first chamber being effected by the direct action of an actuating fluid upon the liquid and in the succeeding chamber by direct action of an actuating fluid upon a liquid, the actuating fluid being delivered through the first chamber.

94. In an apparatus for actuating liquids, the combination of a first pump chamber; a connection for conveying actuating fluid to said chamber; means for conducting liquid to said chamber; a succeeding pump chamber smaller than the first pump chamber; means for permitting the escape of actuating fluid from the first pump chamber to the succeeding pump chamber during the filling movement of liquid to the first pump chamber; means for cutting off the escape to expel the liquid from the first pump chamber; and mechanism for stopping the pumping action from the first pump chamber to the second pump chamber upon the filling of the second pump chamber.

95. In an apparatus for actuating liquids, the combination of a first pump chamber; a connection for conveying actuating fluid to said chamber; means for conducting liquid to said chamber; a succeeding pump chamber smaller than the first pump chamber; means for permitting the escape of actuating fluid from the first pump chamber to the succeeding pump chamber during the filling movement of liquid to the first pump chamber; means for cutting off the escape to expel the liquid from the first pump chamber; and mechanism for opening the means of escape from the first pump chamber to stop the pumping action from the first pump chamber to the second pump chamber and to deliver actuating fluid from the succeeding pump chamber to expel the liquid from the succeeding pump chamber.

96. In an apparatus for actuating liquids, the combination of a first pump chamber; a connection for conveying actuating fluid to said chamber; means for conducting liquid to said chamber; a succeeding pump chamber smaller than the first pump chamber; means for permitting the escape of actuating fluid from the first pump chamber to the succeeding pump chamber during the filling movement of liquid to the first pump chamber; means for cutting off the escape to expel the liquid from the first pump chamber; means for balancing the pressure upon the two chambers to open the means of escape from the first chamber to the succeeding chamber to stop the pumping action and to admit actuating fluid to the succeeding chamber for expelling the liquid therefrom.

97. In an apparatus for actuating liquids, the combination of a first pump chamber; a succeeding pump chamber smaller than the first pump chamber; a liquid connection between said chambers; an actuating fluid connection between said chambers independent of the liquid connection; means for controlling said connections to balance the pressure in said chambers upon the filling of the succeeding chamber to stop the pumping action and to deliver actuating fluid from the succeeding chamber to expel liquid therefrom.

98. In an apparatus for actuating liquids, the combination of a first pump chamber; a succeeding pump chamber smaller than the first pump chamber; a connection between said chambers; an actuating fluid connection between said chambers independent of the liquid connection; means for controlling said connections to balance the pressure in said chambers upon the filling of the succeeding chamber to stop the pumping action and to deliver actuating fluid from the succeeding chamber to expel liquid therefrom, the actuating fluid to the succeeding chamber being delivered through the first chamber.

99. In an apparatus for actuating liquids, the combination of a primary pump chamber; a secondary pump chamber into which liquid is pumped from the primary pump chamber; means for conveying actuating fluid to said secondary chamber; means for controlling the expulsion of liquid from said secondary chamber to take out of said chamber measured charges of less than the capacity of the secondary chamber and to deliver the same to the desired point independently of the remaining liquid in the chamber.

100. In an apparatus for actuating liquids, the combination of a primary pump chamber; a secondary pump chamber into which liquid is pumped from the primary pump chamber, said secondary chamber having a greater capacity than the primary chamber; means for conveying actuating fluid to said secondary chamber; means for controlling the expulsion of liquid from said secondary chamber to take out of said chamber measured charges of less than the capacity of the secondary chamber and to deliver the same to the desired point independently of the remaining liquid in the chamber.

101. In an apparatus for actuating liquids, the combination with a primary pump chamber; means for conveying actuating fluid to said primary pump chamber; a secondary pump chamber; means for conveying liquid from said primary chamber to the secondary chamber and for conveying actuating fluid through the primary chamber to the secondary chamber; and means for controlling the expulsion of liquid from the secondary chamber to take out measured charges of less than the capacity of the chamber and to deliver the same to a desired point independently of the remaining liquid in said secondary chamber.

102. In an apparatus for actuating liquids, the combination of a primary pump chamber; a secondary pump chamber; means for conveying liquid from the primary chamber to the secondary chamber; means for forcing said pumping action by a direct action of actuating fluid on said liquid; means for stopping the pumping action from the primary to the secondary chamber upon the filling of the secondary chamber; means for delivering actuating fluid to the secondary chamber; and means for controlling the expulsion of liquid from the secondary chamber to take out measured charges of less than the capacity of the secondary chamber and to deliver the same to a desired point independently of the remaining liquid in the chamber.

103. In an apparatus for actuating liquids, the combination of a first pump chamber; a series of pump chambers of smaller capacity to which liquid is successively passed from the first pump chamber; means for delivering actuating fluid to the first pump chamber; and means for controlling the expulsion of liquid from the first pump chamber to take out measured charges less than the capacity of the succeeding pump chambers to carry the same through said succeeding pump chambers independently of the remaining liquid in the first chamber.

104. In an apparatus for actuating liquids, the combination of a primary pump chamber; a secondary or storage chamber into which liquid is pumped from the primary chamber having greater capacity than the primary chamber; a measuring chamber through which liquid is pumped from the secondary chamber, the measuring chamber having less capacity than the secondary chamber; and means for delivering actuating fluid and controlling the expulsion of liquid from said chambers to expel liquid from the primary to the storage chamber to stop the pumping action from the primary to the secondary chamber upon the filling of the secondary chamber to take out measured charges from the secondary chamber to the measuring chamber equal to the capacity of the measuring chamber and to expel the same from the measuring chamber independent of the liquid remaining in the secondary chamber.

105. In an apparatus for actuating liquids, the combination of a primary pump chamber; a secondary or storage chamber into which liquid is pumped from the primary chamber having greater capacity than the primary chamber; a measuring chamber through which liquid is pumped from the secondary chamber, the measuring capacity having less capacity than the secondary chamber; and means for delivering actuating fluid to the primary, secondary and measuring chambers, and controlling the expulsion of liquid from said chambers to expel liquid from the primary to the storage chamber to stop the pumping action from the primary to the secondary chamber upon the filling of the secondary chamber to take out measured charges from the secondary chamber to the measuring chamber equal to the capacity of the measuring chamber and to expel the same from the measuring chamber independent of the liquid remaining in the secondary chamber.

106. In an apparatus for actuating liquids, the combination of a primary chamber; a secondary chamber of greater capacity than the primary chamber; a measuring chamber of smaller capacity than the secondary chamber; liquid connections between said chambers; means of escape from the primary chamber to the secondary chamber and from the secondary chamber to the measuring chamber; means for cutting off said means of escape as said chambers become filled; and means for delivering actuating fluid escaping through said means of escape during the filling movement for forcing an expulsion of liquid from said chambers when said means of escape is cut off.

107. In an apparatus for actuating liquids, the combination of a primary pump chamber; a secondary or storage chamber into which liquid is pumped from the primary chamber having greater capacity than the primary chamber; a measuring chamber to which liquid is pumped from the secondary chamber, the measuring chamber having less capacity than the secondary chamber; and means for delivering actuating fluid and controlling the expulsion of liquid from said chambers to expel liquid from the primary to the storage chamber to stop the pumping action from the primary to the secondary chamber upon the filling of the secondary chamber to take out measured charges from the secondary chamber to the measuring chamber equal to the capacity of the measuring chamber and to expel the same from the measuring chamber independent of the liquid remaining in the secondary chamber; and a series of chambers approximating the size of the measuring chamber through which the liquid from the measuring chamber is expelled successively.

108. In an apparatus for actuating liquids, the combination of a primary pump chamber; a secondary or storage chamber into which liquid is pumped from the primary chamber having greater capacity than the primary chamber; a measuring chamber through which liquid is pumped from the secondary chamber, the measuring chamber having less capacity than the secondary chamber; and means for delivering actuating fluid and controlling the expulsion of liquid from said chambers to expel liquid from the primary to the storage chamber to stop the pumping action from the primary to the secondary chamber upon the filling of the secondary chamber to take out measured charges from the secondary chamber to the measuring chamber equal to the capacity of the measuring chamber and to expel the same from the measuring chamber independent of the liquid remaining in the secondary chamber; a series of chambers approximating the size of the measuring chamber through which the liquid from the measuring chamber is expelled successively through the action of the actuating fluid delivered to the primary chamber.

109. In an apparatus for actuating liquids, the combination of a first pump chamber;

a succeeding chamber into which liquid is pumped from the first pump chamber, the succeeding chamber being smaller than the first pump chamber; an overflow connection between said chambers; means for conveying actuating fluid to the first of said chambers for expelling liquid therefrom; and means for stopping the pumping action of the first pump chamber upon the filling of the succeeding chamber.

110. In an apparatus for actuating liquids, the combination of a first pump chamber; a succeeding chamber into which liquid is pumped from the first pump chamber, the succeeding chamber being smaller than the first pump chamber; an overflow connection between said chambers, said overflow connection between said chambers forming a connection for actuating fluids for the succeeding pump chamber; means for conveying actuating fluid to the first of said chambers for expelling liquid therefrom; and means for stopping the pumping action of the first pump chamber upon the filling of the succeeding chamber.

111. In an apparatus for actuating liquids, the combination of two chambers; a liquid connection between said chambers through which liquid is forced by a following action of actuating fluid; a second connection between said chambers; means for closing said second connection during the expulsion of liquid from the first of said chambers and for opening said second connection during the expulsion of liquid from the second of said chambers.

112. In an apparatus for actuating liquids, the combination of the chamber I; the chamber K; the liquid connection J' between said chambers through which liquid is forced by a following action of the liquid through the lift; and the secondary connection J through which actuating fluid passes to expel liquid from the chamber K.

113. In an apparatus for actuating liquids, the combination of a series of pump chambers; means for connecting said chambers with a source of actuating fluid supply; liquid connections between said chambers through which liquid is forced by a following action of actuating fluid while in direct connection with a fluid supply; means for cutting off the supply after the liquid has passed the second chamber, the remaining liquid being expelled through the expansion of actuating fluid in the apparatus.

114. In an apparatus for actuating liquids, the combination of a series of pump chambers through which liquid is passed in stages by a following action of the actuating fluid with the liquid; the chamber M to which the liquid is delivered from said series; valves for controlling the flow of actuating fluid; motors controlling said valves; the connection $D^{14}$ for connecting said motors with the chamber M, said motors being arranged to close said valves and cut off the supply controlled by said valves as the chamber M becomes filled.

115. In an apparatus for actuating liquids, the combination of a primary pump chamber; a storage chamber into which liquid is pumped from the primary chamber, the storage chamber having greater capacity than the primary chamber; a measuring chamber into which liquid is pumped from the storage chamber; a series of pump chambers from which liquid is forced from the measuring chamber, said series of chambers being of a size approximating the size of the measuring chamber; a final chamber through which the liquid is forced; means for delivering actuating fluid to the primary chamber; and means for controlling said actuating fluid and expulsion of liquid to discharge liquid from the primary chamber as it is filled to the secondary chamber to discharge measured charges equal to the capacity of the measuring chamber from the secondary chamber as it is filled and to carry the measured charges from the measuring chamber through the series of chambers to the final chamber; and mechanism for cutting off the supply of actuating fluid as the liquid fills the final chamber, said mechanism being arranged to maintain pressure on the final chamber to expel the same by expansion.

116. In an apparatus for actuating liquids, the combination of a primary pump chamber; a secondary pump chamber into which liquid is pumped; a measuring chamber into which liquid is pumped from the secondary chamber; a series of chambers through which liquid is pumped from the measuring chamber, the lift from the secondary to the measuring chamber and from the measuring chamber to the series of chambers being greater than the lift between the primary and secondary chambers; means for conveying actuating fluid continuously to the primary chamber in small volume; mechanism for adding to the supply of actuating fluid to the primary chamber incident to the pressure of the column in the lift between the primary and secondary chamber; and mechanism for adding a further supply incident to the pressure for raising the liquid from the secondary to the measuring chamber and maintaining said further supply during the expulsion of the liquid through the series of chambers.

117. In an apparatus for actuating liquids, the combination of a primary pump chamber; a secondary pump chamber into which liquid is pumped; a measuring chamber into which liquid is pumped from the secondary chamber; a series of chambers through which liquid is pumped from the measuring chamber, the lift from the secondary to the measuring chamber and from the measuring chamber to the series of chambers being greater than the lift between the primary and secondary chambers; a connection D for delivering actuating fluid to the primary chamber; the restricted passage $D^3$ normally opened to said connection; the valve $D^{18}$; a motor for opening said valve, said motor being set to act with the pressure incident to raising a column from the primary to the secondary chamber; the valve $D^{11}$, said valve being arranged to open with a pressure incident to raising the column from the secondary to the measuring chamber and to be maintained in an open position during the passage of the liquid through the series of chambers; and means for closing said valves when liquid has been raised through said series of chambers.

118. In an apparatus for actuating liquids, the combination with a pump chamber long in a vertical direction; the pipe $h^4$ for delivering liquid to said chamber; and a spreader $h^8$ for directing the delivery against surfaces in the chamber to prevent an unretarded drop of the liquid to the level of the liquid in the chamber.

119. In an apparatus for actuating liquids, the combination of a pump chamber; means for delivering actuating fluid to said chamber; a valve controlling a passage for conveying actuating fluid from said chamber; a cup shaped float controlling said valve, said float having its open part uppermost with the passage opening within the float.

120. In an apparatus for actuating liquids, the combination of a series of pump chambers; means for supplying actuating fluid to said chamber; means for escape of said actuating fluid from said chamber during a filling movement of liquid; means for controlling the escape of actuating fluid to expel the liquid from said chambers, said means for conveying actuating fluid and means for controlling the escape of actuating fluid being arranged to expel the liquid from the higher chamber when the level of liquid reaches said higher chamber and automatically to change the initial pumping action to the lower of said chambers when said level of liquids is lowered.

121. In an apparatus for actuating liquids, the combination of a series of chambers; means for conveying actuating fluid continuously to one of said chambers; means for normally permitting the escape of actuating fluid from the chamber to which it is so admitted; means for closing said escape to expel the liquid therefrom, the closing of the escape of the higher chambers and the expelling of liquids therefrom being accomplished without the action in the lower chamber when the level of liquid to be pumped reaches the higher chamber.

122. In an apparatus for actuating liquids, the combination of the chambers B and E; means for conveying actuating fluid continuously to said chamber B in restricted quantities; the floats $b^3$ and $e$; the escape passages C and F; leading from said chambers B and E respectively; the valves $b^5$ and $e'$ controlling said escape passages; means for conveying actuating fluid to the chamber E arranged to effect a pumping action in said chamber prior to a pumping action in the chamber B when the initial level of liquid reaches the upper portion of chamber E.

123. In an apparatus for actuating liquids, the combination of a pump chamber; means for conveying liquid to said chamber, said means comprising a check valve and having its point of discharge in the chamber above the bottom of the chamber; and an eduction tube having its opening to the chamber below the point of discharge of the means of conducting liquid to the chamber.

124. In an apparatus for actuating liquids, the combination of a primary pump chamber; means for conducting liquid to said chamber; a secondary pump chamber into which liquid is pumped from the primary chamber; means for turning into the primary chamber a supply of actuating fluid for expelling liquid therefrom to the secondary chamber and from the secondary chamber; and means actuated by the actuating fluid passed through the primary chamber for cutting off said supply.

125. In an apparatus for actuating liquids the combination of a primary pump chamber; means for conducting liquid to said chamber; a secondary pump chamber into which liquid is pumped from the primary chamber; means for turning into the primary chamber a supply of actuating fluid for expelling liquid therefrom to the secondary chamber and from the secondary chamber; and means actuated by actuating fluid passed through the primary chamber after the expulsion of liquid therefrom for cutting off said supply.

126. In an apparatus for actuating liquids, the combination of a primary pump chamber; means for conducting liquid to said chamber; a secondary pump chamber into which liquid is pumped from the primary chamber; means for turning into the primary chamber a supply of actuating fluid for expelling liquid therefrom to the secondary chamber and from the secondary chamber; and means actuated by actuating fluid passed through the secondary chamber for cutting off said supply.

127. In an apparatus for actuating liquids, the combination of a pump chamber; means for conveying a liquid to be pumped to the chamber; a discharge pipe leading into the chamber, the end of the pipe extending downwardly; a valve for closing said discharge pipe; a cup shaped float controlling said valve having its upper end open, and telescoping the end of the discharge pipe; means for conveying actuating fluid to the pump chamber, said actuating fluid acting upon any liquid within the float and forcing the same through the discharge pipe to restore the buoyancy of the float; and check valves preventing a retrograde movement of the liquid as it moves to and from the chamber.

In testimony whereof I have hereunto set my hand in the presence of two subscribing witnesses.

RUDOLPH CONRADER.

Witnesses:
D. HIGBY,
H. C. LORD.